United States Patent
Zhao et al.

(10) Patent No.: US 9,325,124 B2
(45) Date of Patent: Apr. 26, 2016

(54) PHOTOVOLTAIC CONNECTOR

(71) Applicants: BOE Technology Group Co., Ltd., Beijing (CN); Beijing BOE Energy Technology Co., Ltd., Beijing (CN)

(72) Inventors: Peng Zhao, Beijing (CN); Peihuan Yang, Beijing (CN); Ping Zheng, Beijing (CN); Xuyang Wang, Beijing (CN); Ming Cui, Beijing (CN)

(73) Assignees: BOE TECHNOLOGY GROUP CO., LTD., Beijing (CN); BEIJING BOE ENERGY TECHNOLOGY CO., LTD., Beijing (CN)

( * ) Notice: Subject to any disclaimer, the term of this patent is extended or adjusted under 35 U.S.C. 154(b) by 112 days.

(21) Appl. No.: 13/955,558

(22) Filed: Jul. 31, 2013

(65) Prior Publication Data

US 2014/0038456 A1 Feb. 6, 2014

(30) Foreign Application Priority Data

Aug. 3, 2012 (CN) ...................... 2012 2 0384206 U

(51) Int. Cl.
- *H01R 4/26* (2006.01)
- *H01R 24/38* (2011.01)
- *H01R 13/59* (2006.01)
- *H01R 13/52* (2006.01)
- *H01R 13/622* (2006.01)
- *H01R 101/00* (2006.01)

(52) U.S. Cl.
CPC ................ *H01R 24/38* (2013.01); *H01R 13/59* (2013.01); *H01R 13/5205* (2013.01); *H01R 13/622* (2013.01); *H01R 2101/00* (2013.01)

(58) Field of Classification Search
CPC .... H01R 13/59; H01R 24/38; H01R 13/5205; H01R 13/622
USPC .......... 439/320–323, 461–462, 441, 888–889
See application file for complete search history.

(56) References Cited

U.S. PATENT DOCUMENTS

| | | | | | |
|---|---|---|---|---|---|
| 2,306,821 | A | * | 12/1942 | Markey .......................... | 439/320 |
| 2,655,638 | A | * | 10/1953 | Allen ............................. | 439/271 |
| 4,973,370 | A | * | 11/1990 | Kreinberg ............ | H01R 4/2495 156/50 |
| 8,591,247 | B2 | * | 11/2013 | Zhu ............................... | 439/352 |
| 8,662,914 | B2 | * | 3/2014 | Keswani ....................... | 439/441 |
| 2011/0111613 | A1 | * | 5/2011 | Su et al. ....................... | 439/271 |

* cited by examiner

*Primary Examiner* — Khiem Nguyen
(74) *Attorney, Agent, or Firm* — Ladas & Parry LLP

(57) ABSTRACT

Embodiments of the present invention provide a photovoltaic (PV) connector, comprising a first connecting unit and a second connecting unit detachably connected with the first connecting unit, wherein the first connecting unit includes a first conductor, a first stop ring, a first housing and a first conductor core provided inside and detachably connected to the first housing; the first conductor is electrically connected with a pressing end of the first conductor core; the first stop ring is detachably connected with the first housing; the second connecting unit includes a second conductor, a second housing, a second stop ring and a second conductor core provided inside and detachably connected to the second housing; the second conductor is electrically connected with a pressing end of the second conductor core; the second stop ring is detachably connected with the second housing.

11 Claims, 2 Drawing Sheets

PHOTOVOLTAIC CONNECTOR

CROSS REFERENCE TO RELATED APPLICATIONS

This application claims priority from Chinese National Application No., 201220384206.5 filed on Aug. 3, 2012 the contents of which are incorporated herein by reference.

TECHNICAL FIELD

Embodiments of the present invention relate to a photovoltaic (PV) connector.

BACKGROUND

Solar photovoltaic power generation is a technique that directly converts light energy into electric energy by using a PV effect. The key component of a solar power generation system is PV units which are connected in series and in parallel with one another by means of PV connectors in junction boxes so as to obtain a DC voltage and a DC current required by the input of an inverter. In general, a PV connector comprises a positive connecting terminal and a negative connecting terminal which are respectively connected to two output ends of a junction box. When a plurality of PV units are connected in series with one another, the positive connecting terminal of a junction box is connected with a negative connecting terminal of a previous junction box, and the negative connecting terminal is connected with a positive connecting terminal of a next junction box; or alternatively, the negative connecting terminal is connected with the positive connecting terminal of a previous junction box, and the positive connecting terminal is connected with a negative connecting terminal of a next junction box. When a plurality of PV units are connected in parallel with one another, the positive connecting terminal of a junction box is connected with the positive connecting terminal of a previous junction box, and the negative connecting terminal is connected with the negative connecting terminal of a next junction box; or alternatively, the negative connecting terminal is connected with the negative connecting terminal of a previous junction box, and the positive connecting terminal is connected with the positive connecting terminal of a next junction box.

In the prior art, most of PV connectors are generally composed of male PV connectors and female PV connectors, and achieve a self-locking fastening by using a snap connection. Such a structure may result in the problem of poor electrical contact and may be difficult to disassemble; and the disassembled components of the PV connector may readily be damaged and cannot be repaired, so that the service life of the PV connector may be reduced.

SUMMARY

In one aspect of the present invention, a PV connector is provided, comprising:

a first connecting unit and a second connecting unit detachably connected with the first connecting unit, wherein the first connecting unit includes a first conductor, a first housing and a first conductor core provided inside the first housing and detachably connected with the first housing;

the first conductor is electrically connected with a pressing end of the first conductor core;

the second connecting unit includes a second conductor, a second housing and a second conductor core provided inside the second housing and detachably connected with the second housing;

the second conductor is electrically connected with a pressing end of the second conductor core.

Preferably, the first connecting unit further includes a first stop ring; the second connecting unit further includes a second stop ring; the first stop ring is detachably connected with the first housing; and the second stop ring is detachably connected with the second housing.

Preferably, the first conductor is electrically connected with the pressing end of the first conductor core by a press connection.

Preferably, the second conductor is electrically connected with the pressing end of the second conductor core by a press connection.

Preferably, the outer surface of the first housing is provided with an external thread structure through which the first stop ring is threadably connected with the first housing.

Preferably, a locking ring is provided outside the second connecting unit; the inner surface of the locking ring is provided with an internal thread structure; and the second connecting unit is threadably connected with the first connecting unit by an engagement between the internal thread structure and the external thread of the first housing.

Preferably, the inner surface of the first housing is provided with an internal thread structure through which the first conductor core is threadably connected with the first housing.

Preferably, the outer surface of the second housing is provided with an external thread structure through which the second stop ring is threadably connected with the second housing.

Preferably, the inner surface of the second housing is provided with an internal thread structure through which the second conductor core is threadably connected with the second housing.

Preferably, a waterproof rubber pad is provided between the first housing and the first stop ring, and a waterproof rubber pad is provided between the second housing and the second stop ring.

Preferably, a waterproof gasket is provided between the second housing and the locking ring, and a waterproof gasket is provided between the first housing and the first stop ring.

BRIEF DESCRIPTION OF THE DRAWINGS

The accompanying drawings of the embodiments will be described below to provide a more clear understanding of the technical solutions of the embodiments of the present invention. Obviously, the drawings as described below only relate to some embodiments of the present invention and should not be construed as a limitation to the present invention.

DETAILED DESCRIPTION

Figure 1:
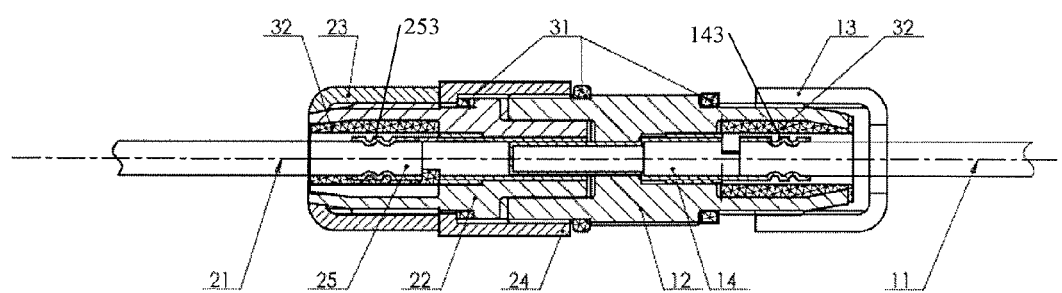
FIG. 1 is a schematic sectional view of a PV connector according to an embodiment of the present invention.

The embodiments of the present invention will be further described below. The examples of the embodiments are as illustrated in the accompanying drawings, in which identical or similar reference numerals refer to identical or similar elements or elements with identical or similar functions throughout. The embodiments described more fully hereafter with reference to the accompanying drawings are illustrative and only used for illustrating the present invention and should not be construed as a limitation to the present invention.

Unless otherwise defined, the technical or scientific terms used herein should have the same meaning as commonly understood by those skilled in the art. It should be understood that: in the description of the present invention, the orientation or position relationships indicated by the terms such as "center", "longitudinal", "transverse", "upper", "lower", "front", "rear", "left", "right", "vertical", "horizontal", "top", "bottom", "inner", "outer" and the like are based on the orientation or position relationships shown in the accompanying drawings, and the terms are only for the convenient and simplified description of the present invention, do not indicate or imply that the devices or components described by the terms must have specific orientations and be constructed and operated at specific orientations, and thus should not be construed as the limitation of the present invention. Moreover, the terms "first" and "second" are only for the purpose of description and should not be construed as the indication or implication of the relative importance.

It should be noted that: in the description of the present invention, unless otherwise specifically defined, the terms "mounted to", "connected to" and "connected with" should be broadly understood. For example, it may be a fixed connection, detachable connection or integrated connection; it may be mechanical connection or electrical connection; and may be direct connection, indirect connection through an intermediate medium, or internal communication between two elements. The specific meanings of the terms in the present invention can be understood by those skilled in the art in view of specific conditions.

Moreover, in the description of the present invention, unless other specified, "a plurality of" refers to two or more.

Figure 2:
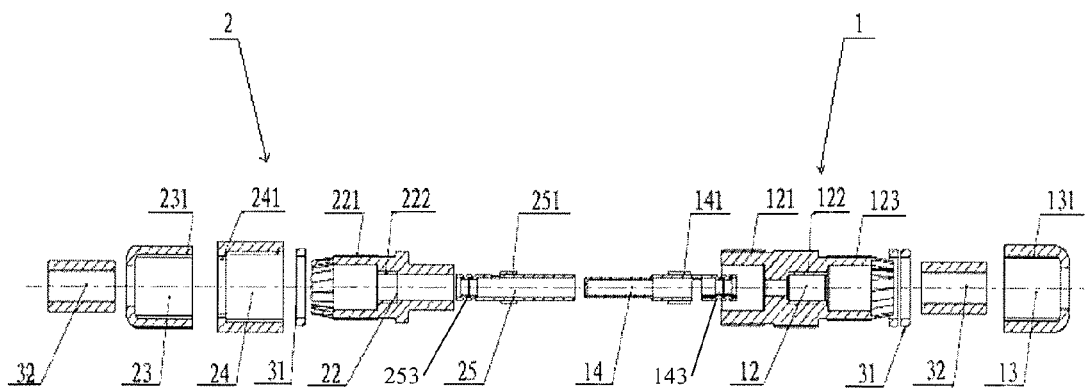
FIG. 2 is a schematic exploded view of the PV connector according to an embodiment of the present invention.
Figure 3:
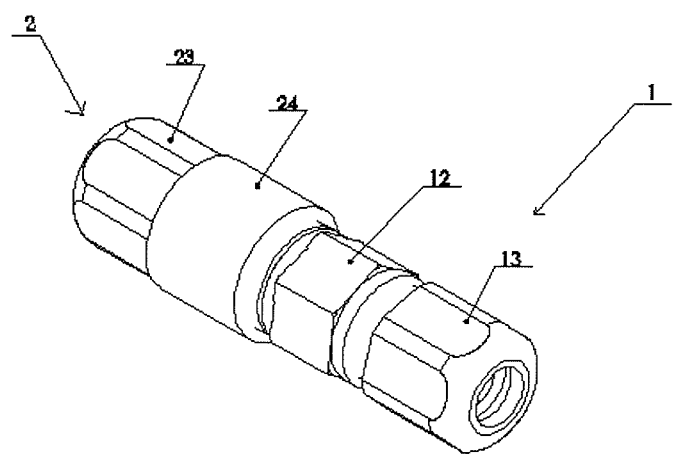
FIG. 3 is a schematic overall view of the PV connector according to an embodiment of the present invention.

As illustrated in FIGS. 1 to 3, in some embodiments of the present invention, the PV connector comprises a first connecting unit 1 and a second connecting unit 2 detachably connected to the first connecting unit 1, wherein the first connecting unit 1 includes a first conductor 11, a first stop ring 13, a first housing 12 and a first conductor core 14 provided inside and detachably connected to the first housing 12. The first conductor 11 is electrically connected with a pressing end 143 of the first conductor core 14; the first stop ring 13 is detachably connected with the first housing 12. The second connecting unit 2 includes a second conductor 21, a second housing 22, a second stop ring 23 and a second conductor core 25 provided inside and detachably connected to the second housing 22. The second conductor 21 is electrically connected with a pressing end 253 of the second conductor core 25. The second stop ring 23 is detachably connected with the second housing 22.

In some embodiments of the present invention, the first connecting unit 1 is the positive connecting terminal of the PV connector, and the second connecting unit 2 is the negative connecting terminal of the PV connector. In other embodiments of the present invention, the first connecting unit 1 is the negative connecting terminal of the PV connector, and the second connecting unit 2 is the positive connecting terminal of the PV connector.

In some embodiments of the present invention, the detachable connection is in form of a threaded connection. For example, the first conductor core 14 is threadably connected with the first housing 12; the first stop ring 13 is threadably connected with the first housing 12; the second conductor core 25 is threadably connected with the second housing 22; and the second stop ring 23 is threadably connected with the second housing 22. But other means capable of achieving a detachable connection are also applicable. For example, other connection such as snap connection or bolt connection or the like may be also adopted.

The PV connector of the present invention can effectively ensure a good electrical contact among various components, and can be easily disassembled and replaced, resulting in a reduced damage possibility of the PV connector, and simultaneously a good waterproof performance.

Further referring to FIGS. 1 to 3, in some embodiments of the present invention, the PV connector comprises: the outer surface of the first housing 12 is provided with a first external thread 121 and a second external thread 123; the first stop ring 13 is provided with an internal thread 131. The first stop ring 13 is threadably connected with the first housing 12 by an engagement between the internal thread 131 and the second external thread 123. The inner surface of the first housing 12 is provided with a first internal thread 122; and the first conductor core 14 is provided with a third external thread 141 and the first conductor core 14 is threadably connected with the first housing 12 by an engagement between the first internal thread 122 and the third external thread 141. In some preferred embodiments of the present invention, the first conductor 11 is electrically connected with a pressing end 143 of the first conductor core 14 by means of a press connection. Of course, besides the press connection, in other embodiments of the present invention, the first conductor 11 may be also electrically connected with the first conductor core 14 by means of winding or clamping.

A locking ring 24 is provided outside the second connecting unit; the inner surface of the locking ring 24 is provided with a fourth internal thread 241; and the locking ring 24 detachably connects the second connecting unit 2 to the first connecting unit 1 by a threaded connection between the fourth internal thread 241 and the first external thread 121 of the first housing 12.

The outer surface of the second housing 22 is provided with a fourth external thread 221; and the second stop ring 23 is provided with a third internal thread 231 and the second stop ring 23 is threadably connected with the second housing 22 by an engagement between the third internal thread 231 and the fourth external thread 221 on the second housing 22.

The inner surface of the second housing 22 is provided with a second internal thread 222; and the second conductor core 25 is provided with a fifth external thread 251 and the second conductor core 25 is threadably connected with the second housing 22 by an engagement between the fifth external thread 251 and the second internal thread 222. The second conductor 21 is electrically connected with a pressing end 253 of the second conductor core 25 by a press connection.

In the embodiments as illustrated in FIGS. 1 and 2, the pressing end 143 of the first conductor core 14 is in a wave form. When the first conductor 11 is inserted into the pressing end 143 of the first conductor core 14, the wavy pressing end 143 presses against the first conductor 11 by the elasticity of the pressing end and/or a force applied by other components, so as to form an electrical connection by the press connection. Similarly, the pressing end 253 of the second conductor core 25 is in a wave form. When the second conductor 21 is inserted into the pressing end 253 of the second conductor core 25, the wavy pressing end 253 presses against the second conductor 21 by the elasticity of the pressing end and/or a force applied by other components, so as to form electrical connection by the press connection.

As the first conductor 11 is electrically connected with the first conductor core 14 by means of a press connection and the second conductor 21 is electrically connected with the second conductor core 25 by means of a press connection, a reliable electrical connection between the first conductor 11 and the first conductor core 14, and a reliable electrical connection between the second conductor 21 and the second conductor core 25 can be effectively achieved. The threaded connection between the locking ring 24 and the first housing 12 insures a reliable physical connection between the first conductor core 14 and the second conductor core 25, and thus insures a reliable electrical connection between the first conductor core 14 and the second conductor core 25.

Moreover, threaded connections are provided between the first housing 12 and the first stop ring 13, between the first housing 12 and the first conductor core 14, between the second housing 22 and the second conductor core 25, between the second housing 22 and the second stop ring 23 and between the first housing 12 and the locking ring 24, and therefore, a convenient mounting, fixing and detaching of the PV connector is achieved at a maximum extent. In some embodiments of the present invention, a waterproof rubber pad structure 32 is provided between first housing 12 and the first conductor core 14 and outside the first internal thread 122 and the third external thread 141 that are engaged with each other. In addition, a waterproof rubber pad structure 32 is provided between the second housing 22 and the second conductor core 25 and outside the fifth external thread 251 and the second internal thread 222 that are engaged with each other. In some embodiments of the present invention, waterproof gaskets 31 are provided between the second housing 22 and the locking ring 24, and between the first housing 12 and the first stop ring 13, so as to insure a good seal waterproof among various components in the PV connector. Although specific positions of the waterproof rubber pads and the waterproof gaskets have been illustrated in the accompanying drawings of the present invention, it should be understood by those skilled in the art that the waterproof rubber pads and the waterproof gaskets may be provided at other positions as long as the good real waterproof between various components in the PV connector can be achieved.

Although the first stop ring 13 and the second stop ring 23 are included in the embodiments as illustrated in the accompanying drawings of the present invention, the present invention is not limited hereto. Some alternative embodiments of the present invention may not include one or both of the first stop ring 13 and the second stop ring 23.

Although the waterproof rubber pad structure 32 and the waterproof gasket 31 are included in the embodiments as illustrated in the accompanying drawings of the present invention, the present invention is not limited hereto. Some preferred embodiments of the present invention may not include one or both of the waterproof rubber pad structure 32 and the waterproof gasket 31.

The mounting process of the PV connector is further described below.

Firstly, the assemble of the first connecting unit 1: sequentially passing the first stop ring 13 and the first housing 12 through the free end of the first conductor 11; electrically connecting the free end of the first conductor 11 with the first conductor core 14 by a press connection; threadably connecting the first housing 12 to the first conductor core 14; and threadably connecting the first stop ring 13 to the first housing 12.

Secondly, the assemble of the second connecting unit 2: sequentially passing the second stop ring 23, the locking ring 24 and the second housing 22 through the free end of the second conductor 21; electrically connecting the second conductor 21 to second conductor core 25 by a press connection; threadably connecting the second housing 22 to the second conductor core 25; and threadably connecting the second stop ring 23 to the second housing 22.

Finally, the assemble of the first connecting unit 1 with the second connecting unit 2: rotating the locking ring 24 to achieve the tight threaded connection between the locking ring 24 and the first housing 12, so as to ensure a reliable electrical connection between the first conductor core 14 and the second conductor core 25.

The PV connector of the present invention can effectively ensure a good electrical contact among various components, and can be easily disassembled and replaced, resulting in a reduced damage possibility of the PV connector, and simultaneously a good waterproof performance The foregoing is only illustrative embodiments used for illustrating the principles of the present invention and not intended to limit the scope of protection of the present invention. In addition, the foregoing is only preferred embodiments of the present invention. It should be noted that various modifications and alternates may be also made by those skilled in the art without departing from the principle of the present invention and such modifications and alternates should all fall within the scope of protection of the present invention.

The invention claimed is:

1. A photovoltaic connector, comprising:
a first connecting unit and a second connecting unit detachably connected with the first connecting unit,
wherein the first connecting unit includes a first conductor, a first housing and a first conductor core provided inside the first housing and detachably connected to the first housing;
wherein the first conductor is electrically connected with a pressing end of the first conductor core;
wherein the second connecting unit includes a second conductor, a second housing and a second conductor core provided inside the second housing and detachably connected to the second housing;
wherein the second conductor is electrically connected with a pressing end of the second conductor core
wherein the first conductor is electrically connected with the pressing end of the first conductor core by a press connection, and
wherein the first conductor is in wave shape at its end section which is press-connected with the pressing end of the first conductor core to deform the pressing end of the first conductor.

2. The photovoltaic connector according to claim 1, wherein the first connecting unit further includes a first stop ring, the second connecting unit further includes a second stop ring, the first stop ring is detachably connected with the first housing; and the second stop ring is detachably connected with the second housing.

3. The photovoltaic connector according to claim 2, wherein the outer surface of the first housing is provided with an external thread, and the first stop ring is provided with an internal thread and the first stop ring is threadably connected with the first housing by an engagement between the external thread and the internal thread.

4. The photovoltaic connector according to claim 1, wherein the inner surface of the first housing is provided with an internal thread, and the first conductor core is provided with an external thread, and the first conductor core is threadably connected with the first housing by an engagement between the internal thread and the external thread.

5. The photovoltaic connector according to claim 1, wherein a locking ring is provided outside the second housing, the inner surface of the locking ring is provided with an internal thread; the outer surface of the first housing is provided with an external thread; and the second connecting unit is threadably connected with the first connecting unit by an engagement between the internal thread of the locking ring and the external thread of the first housing.

6. The photovoltaic connector according to claim 1, wherein the second conductor is electrically connected with the pressing end of the second conductor core by a press connection.

7. The photovoltaic connector according to claim 2, wherein the outer surface of the second housing is provided with an external thread, and the second stop ring is provided with an internal thread and the second stop ring is threadably connected with the second housing by an engagement between the external thread and the internal thread.

8. The photovoltaic connector according to claim 1, wherein the inner surface of the second housing is provided with an internal thread; and the second conductor core is provided with an external thread and the second conductor core is threadably connected with the second housing by an engagement between the internal thread and the external thread.

9. The photovoltaic connector according to claim 2, wherein a waterproof rubber pad is provided between the first housing and the first stop ring, and a waterproof rubber pad is provided between the second housing and the second stop ring.

10. The photovoltaic connector according to claim 5, wherein a waterproof gasket is provided between the second housing and the locking ring, and a waterproof gasket is provided between the first housing and the first stop ring.

11. A photovoltaic connector, comprising:
a first connecting unit and a second connecting unit detachably connected with the first connecting unit,
wherein the first connecting unit includes a first conductor, a first housing and a first conductor core provided inside the first housing and detachably connected to the first housing;
wherein the first conductor is electrically connected with a pressing end of the first conductor core;
wherein the second connecting unit includes a second conductor, a second housing and a second conductor core provided inside the second housing and detachably connected to the second housing; wherein the second conductor is electrically connected with a pressing end of the second conductor ore,
wherein the first conductor is electrically connected with the pressing end of the first conductor core by a press connection,
wherein the second conductor is electrically connected with the pressing end of the second conductor core by a press connection,
wherein the first conductor is in wave shape at its end section which is press-connected with the pressing end of the first conductor core to deform the pressing end of the first conductor, and
wherein the second conductor is in wave shape at its end section which is press-connected with the pressing end of the second conductor core to deform the pressing end of the second conductor.

* * * * *